United States Patent
Buchmann et al.

(10) Patent No.: US 11,002,592 B2
(45) Date of Patent: May 11, 2021

(54) LABORATORY BALANCE WITH A MOTORIZED DRAFT SHIELD

(71) Applicant: Mettler-Toledo GmbH, Greifensee (CH)

(72) Inventors: Alice Buchmann, Uster (CH); Beat Meister, Naenikon (CH); Marc Zehnder, Uster (CH); Martin Vogt, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 118 days.

(21) Appl. No.: 16/381,300

(22) Filed: Apr. 11, 2019

(65) Prior Publication Data

US 2019/0316955 A1     Oct. 17, 2019

(30) Foreign Application Priority Data

Apr. 17, 2018   (EP) .................................. 18167732

(51) Int. Cl.
   *G01G 21/23*   (2006.01)
   *G01G 21/28*   (2006.01)

(52) U.S. Cl.
   CPC .......... *G01G 21/286* (2013.01); *G01G 21/23* (2013.01)

(58) Field of Classification Search
   CPC ............................ G01G 21/286; G01G 21/23
   USPC ....................................................... 177/180
   See application file for complete search history.

(56) References Cited

U.S. PATENT DOCUMENTS

| | | | |
|---|---|---|---|
| 4,700,793 A | 10/1987 | Lüchinger | |
| 4,789,034 A | 12/1988 | Lüchinger et al. | |
| 5,058,692 A | 10/1991 | Melcher et al. | |
| 5,170,855 A | 12/1992 | Kunz et al. | |
| 6,246,018 B1 | 6/2001 | Schink | |
| 6,504,112 B1 | 1/2003 | Luebke et al. | |
| 6,891,113 B2 | 5/2005 | Fringeli et al. | |
| 2006/0231298 A1* | 10/2006 | Luechinger | G01G 21/286 177/180 |
| 2012/0111646 A1* | 5/2012 | Schillig | G01G 21/28 177/181 |
| 2012/0279788 A1* | 11/2012 | Nuzzi | G01G 21/286 177/180 |
| 2015/0198476 A1* | 7/2015 | Wang | G01G 21/286 177/238 |
| 2015/0204716 A1 | 7/2015 | Lewandowski et al. | |
| 2019/0316953 A1* | 10/2019 | Meister | G01G 21/22 |
| 2019/0316954 A1* | 10/2019 | Buchmann | G01G 21/286 |
| 2019/0316955 A1* | 10/2019 | Buchmann | G01G 21/286 |
| 2020/0284642 A1* | 9/2020 | Zehnder | G01G 13/24 |
| 2020/0284645 A1* | 9/2020 | Zehnder | G01G 17/06 |

\* cited by examiner

*Primary Examiner* — Jacques M Saint Surin
(74) *Attorney, Agent, or Firm* — Standley Law Group LLP; Jeffrey S. Standley; Stephen L. Grant

(57) ABSTRACT

A laboratory balance (1) has a housing, a base body (2) with an upper side (20) facing a weighing pan (14) and an underside (21) facing in the opposite direction of the upper side (20). A draft shield (5) is mounted on the upper side of the base body. The draft shield has a top wall (6), a first sidewall (7), a second sidewall (8) that is to the first sidewall, and a front wall (9). The first sidewall is operated by a first motor unit (25) which is located in the base body. The underside has a first opening (37) that provides access to the first motor unit.

14 Claims, 12 Drawing Sheets

LABORATORY BALANCE WITH A MOTORIZED DRAFT SHIELD

CROSS-REFERENCE TO RELATED APPLICATIONS

This application makes a claim of priority to European Patent Application No. 18167732.9, filed on 17 Apr. 2018, which is incorporated by reference as if fully recited herein.

TECHNICAL FIELD

The invention concerns a balance that is used to weigh small objects with a very high precision of, typically, a fraction of a milligram. The sensitivity which enables a balance to measure weight so precisely also makes the balance susceptible to any air circulation in the area of the weighing pan. The weighing pan and the space above it are therefore separated from the ambient environment by an enclosure—commonly referred to as a draft shield—, which is normally equipped with one or more wall panels that can be opened and closed in the manner of sliding doors. The space inside the draft shield is referred to as the weighing chamber. The term laboratory balance in the present context means any high-precision weighing instrument with a draft-shield-enclosed weighing chamber. Such balances are used in chemical and pharmaceutical laboratories, industrial quality control, the jewelry trade, numismatics, weighing of air-pollution filters, and many other applications.

BACKGROUND ART

Among laboratory balances with a draft shield, the present invention is directed at a subcategory of laboratory balances, wherein the operations of opening and closing the at least one sliding door are driven by at least one motor which may be controlled for example by keyboard commands of a human operator or by an applications program of a laboratory robot or other automated system. Motorized draft shields belong to the established state of the art and have become a common feature of laboratory balances of the highest precision, which are also referred to as analytical balances.

Within this context, the present invention is directed at the motor drive mechanism, specifically its arrangement and location within the basic design architecture of a laboratory balance. Of particular interest is the ease of access for the servicing or exchange of the one or more drive aggregates of the motorized draft shield.

For example, an analytical balance according to U.S. Pat. No. 4,789,034 A has a motorized draft shield that can be opened and closed in a hands-free fashion by means of proximity switches, voice commands or a foot pedal to trigger the actions of a motor that opens and closes an access opening to the draft shield. The sliding glass panels on the sides and the top of the draft shield are moved by electric motors with friction wheels pressing directly against the internal surfaces of the respective panels. The motors with the friction drive mechanisms are mounted on wall surfaces of the balance housing which adjoins the rear wall of the weighing chamber and contains the weighing cell. The terms front, rear, side, top, floor within the present context relate to the balance as it presents itself to a person using the balance that is set up in its operating condition.

Another example of the prior art, U.S. Pat. No. 5,058,692, shows a motor with a friction drive wheel acting against the bottom edge of a sliding wall panel of a balance draft shield. The balance is of a so-called top-loading configuration, i.e. the weighing chamber with the weighing pan is arranged on top of a balance housing that contains the weighing cell. The one or more drive motors for the sliding wall panels are mounted on the inside surface of the balance housing in suitable positions for the frictional contacts between the drive wheels and the respective sliding wall panels. In an alternative configuration of the same concept, the draft shield has the shape of a cylindrical drum, with movable wall segments that slide in circular motion about the cylinder axis and are likewise driven by one or more motors with friction wheels acting on the bottom edges of the cylindrical wall panels.

In U.S. Pat. No. 5,170,855 the upper and lower edges of the draft shield doors, which slide in guide tracks, are kinematically coupled to each other by a rope drive or by a rack and pinion arrangement. Due to this kinematic coupling, the doors glide in exact parallel motion and cannot get stuck in their tracks. It is mentioned (without further details) that the draft shield could be motorized by connecting the coupling means, i.e. the rope drive or the rack and pinion arrangement, to a drive motor.

In U.S. Pat. No. 6,246,018 B1, a balance with a motorized draft shield is proposed wherein partially open positions of the sliding doors are detected by sensors and registered in a memory of the laboratory balance for subsequent recall. The motors themselves are indicated schematically in a block diagram but there is no description of how and where they are mounted.

In U.S. Pat. No. 6,504,112 B1, an analytical balance is described wherein the draft shield has a frameless front glass panel to provide an unobstructed view of the weighing pan. The draft shield doors are said to be movable manually or by motors, but the motors and their arrangement within the balance are neither described nor illustrated.

In regard to the area that is of particular interest in the present invention, i.e. an optimal design arrangement for the servicing or exchange of the one or more drive aggregates of the motorized draft shield, the applicant found no information in the prior art. Therefore, the object of the present invention is to provide a laboratory balance with an arrangement for the draft shield door motors wherein the latter are easily and conveniently accessible for servicing and exchange.

SUMMARY

This task is solved by a laboratory balance with a draft shield having at least one movable wall panel actuated by a motor unit that is arranged in accordance with the independent claim. Advantageous embodiments and detail features of the invention are set forth in the dependent claims.

A laboratory balance of the type to which this invention relates has a housing, and a base body with an upper side facing a weighing pan and an underside facing in the opposite direction of the upper side. Mounted on the upper side of the base body is a draft shield which has a top wall, a first sidewall, a second sidewall arranged parallel to the first sidewall, and a front wall, wherein the first sidewall is operated by a first motor unit. According to the invention, the first motor unit is located in the base body, and the underside of the base body has a first opening providing access to the first motor unit. The first opening is located on the underside vertically below the housing. The proposed arrangement offers ease of access to the first motor unit especially in the event of servicing.

In preferred embodiments of the laboratory balance according to the invention, the second sidewall is operated by a second motor unit, which is likewise located in the base body. The underside of the base body advantageously has a second opening providing access to the second motor unit. In a preferred arrangement, the first opening and the second opening are located adjacent to one another. Dedicated motor units enable both independent and simultaneous operation of the first and second sidewalls. Providing a separate opening for each of the motor units also improves the ease of accessing the motor units in the event of servicing or repairing.

Further, in preferred embodiments of the laboratory balance according to the invention, the base body has a first cavity and a second cavity for receiving, respectively, the first motor unit and the second motor unit. The first and the second cavities serve as an enclosure for receiving the first and the second motor units. This has the advantage that the two motors are separated from each other and cross contamination is prevented. Besides, the cavities may physically separate the motor units from the other components of the base body.

In an alternative embodiment of the laboratory balance according to the invention, the first and second motor units can be located in one cavity.

In an alternative embodiment of the laboratory balance according to the invention, the second sidewall is operable by the first motor unit. This has the advantage that a single motor can be utilized for operating both the sidewalls at the same time.

In a configuration that is common to many laboratory balances, the housing that contains a weighing cell and a central control unit is mounted on the upper side of the base body adjacent to the draft shield. Preferably, in this kind of a design configuration, the aforementioned first and second openings are arranged on the underside of the base body in an area vertically below the housing of the weighing cell. This advantageous arrangement removes the motor units away from the weighing chamber thereby minimizing the effect of convective air currents inside the weighing chamber due to heat dissipation from the motor units.

In embodiments where the base body contains the aforementioned first and second cavities, the first cavity advantageously has a first slot for a first endless belt to operatively connect the first motor unit to the first sidewall, and the second cavity has a second slot for a second endless belt to operatively connect the second motor unit to the second sidewall. The first and the second slots enclose and shield the operative connection between the motor units and their corresponding endless belts.

In preferred embodiments of the invention, the first motor unit includes a first motor, a first wiring harness, a first mounting plate for securing the first motor inside the first cavity, and a first electronic circuit, which is connected to the central control unit by way of the first wiring harness. Analogously, if the balance is equipped with a second motor unit, the second motor unit includes a second motor, a first second harness, a second mounting plate for securing the second motor inside the second cavity, and a second electronic circuit, which is connected to the central control unit by way of the second wiring harness.

Preferably, the first opening and the second opening in the base body are closed against the outside by a first sealing plate and a second sealing plate whose contour shapes conform, respectively, to the first opening and the second opening. The first and the second sealing plates confine and protect the motor units located within the first and second openings from the adversarial effect of dust, moisture, and other corrosive substances.

Preferably, the first and/or second motor unit and the weighing cell are sealed to each other. The first and/or second motor unit may be located in the base body and the weighing cell may be located in the housing and the base body and the housing are sealed to each other. The sealing has the advantage that the sensitive weighing cell cannot be polluted by particles created by the first or second motor unit.

Preferably, the first and/or second motor unit is arranged beneath the weighing cell. This arrangement has the advantage that the motor units and weighing cell are arranged transverse to the draft shield.

In a preferred configuration, a laboratory balance according to the present invention has a weighing chamber wall rising from the upper side of the base body and separating the draft shield from the housing that contains the weighing cell. The weighing chamber wall has a first side corresponding to the first motor unit and a second side corresponding to the second motor unit. Arranged on the first side is a first sensor device that cooperates with the first motor unit to actuate the movements of the first sidewall. A second sensor device cooperating with the second motor unit to actuate the movements of the second sidewall is arranged on the second side of the weighing chamber wall. The first and the second sensor devices contribute to a hands-free operation of the laboratory balance.

BRIEF DESCRIPTION OF THE DRAWINGS

A laboratory balance with the inventive arrangement of motor units for the movable walls of the draft shield will be described hereinafter through embodiments shown schematically in the drawings, wherein identical parts are identified with identical reference numbers and wherein.

DETAILED DESCRIPTION OF THE EMBODIMENTS

Figure 1:
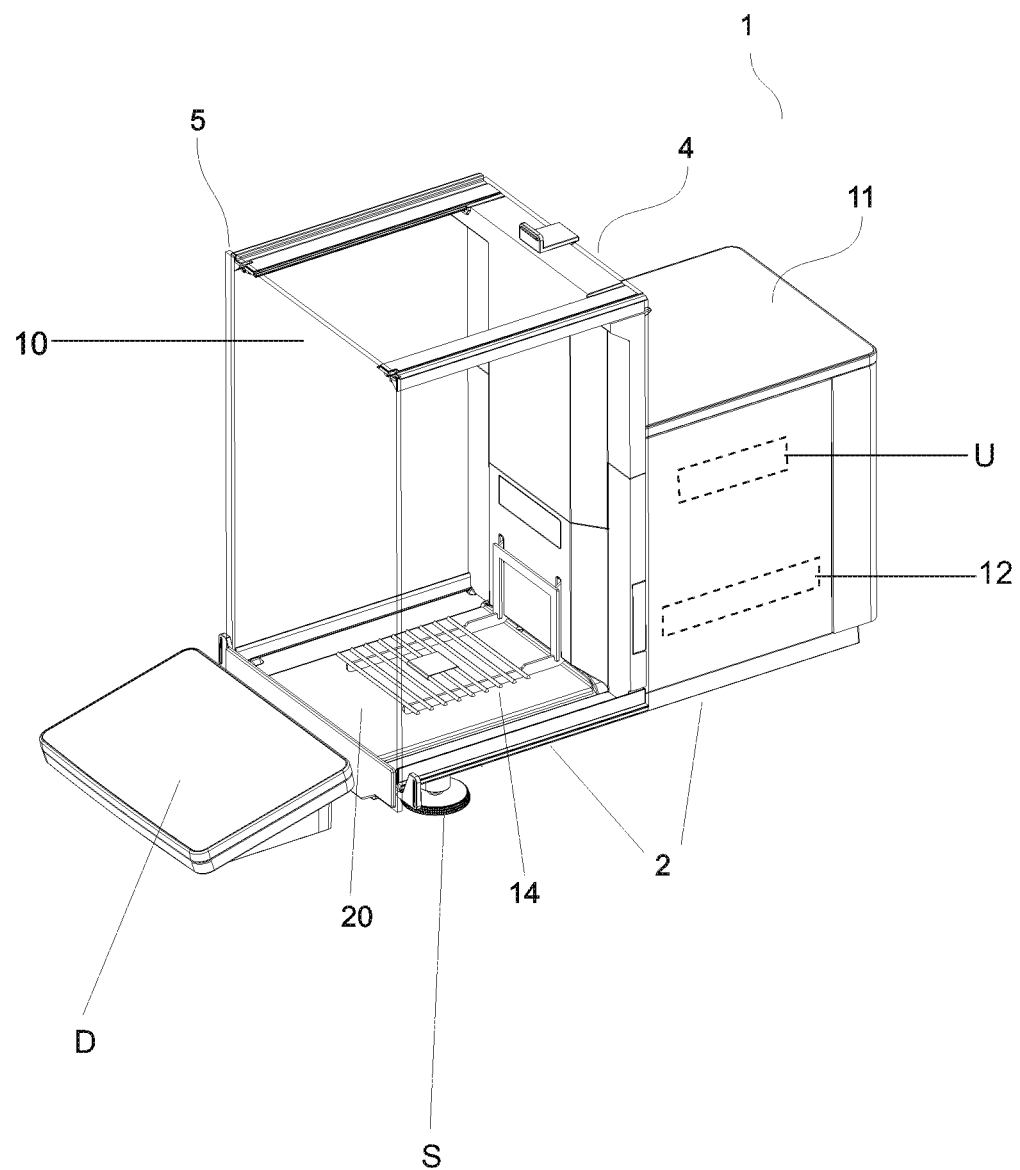
FIG. 1 represents a complete laboratory balance of the type to which the invention relates, in a perspective view.

FIG. 1 illustrates a laboratory balance 1 according to the invention in a three-dimensional view. The principal parts of the laboratory balance 1 are the display console D, the base body 2, the weighing chamber 10, and the housing 12. The weighing pan 14, shown here as a grate-shaped weighing platform 14, is enclosed inside the weighing chamber 10. The weighing platform 14 is cantilevered above the upper side 20 of the base body 2, mechanically connected to the weighing cell 12, which is schematically indicated inside the housing 12. The housing 11 also contains the central control unit U of the balance 1. The transparent draft shield 5, which encloses the weighing chamber 10 is mounted on the upper side 20 of the base body 2 and connected to the housing 11 through the weighing chamber rear wall 4. One of the support feet S of the balance 1 is shown at the corner of the base body 2 that faces the viewer.

Figure 2:
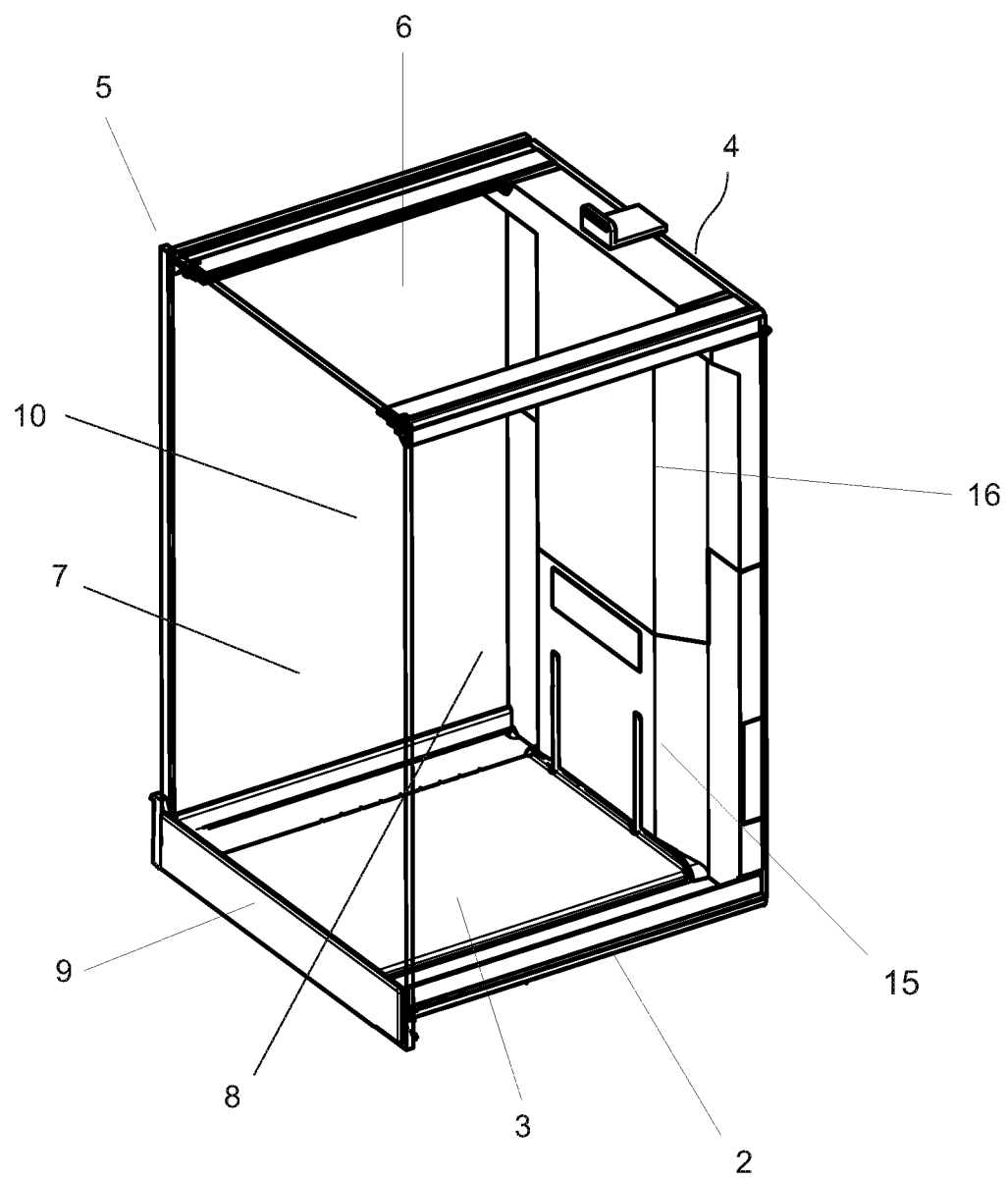
FIG. 2 represents the draft shield of the laboratory balance of FIG. 1, in a perspective view.

FIG. 2 shows the draft shield 5 by itself. The weighing chamber 10 is enclosed by the weighing chamber floor 3, the weighing chamber rear wall 4, and by rectangular transparent glass panels that include a top wall 6, a first sidewall 7, a second sidewall 8, and a front wall 9. The weighing chamber rear wall 4 is of modular construction, with a base module 15 and a top module 16. The base module 15 of the weighing chamber rear wall 4 is connected to the base body 2, while the top module 16 is connected to the top wall 6 of the draft shield 5.

Figure 3:
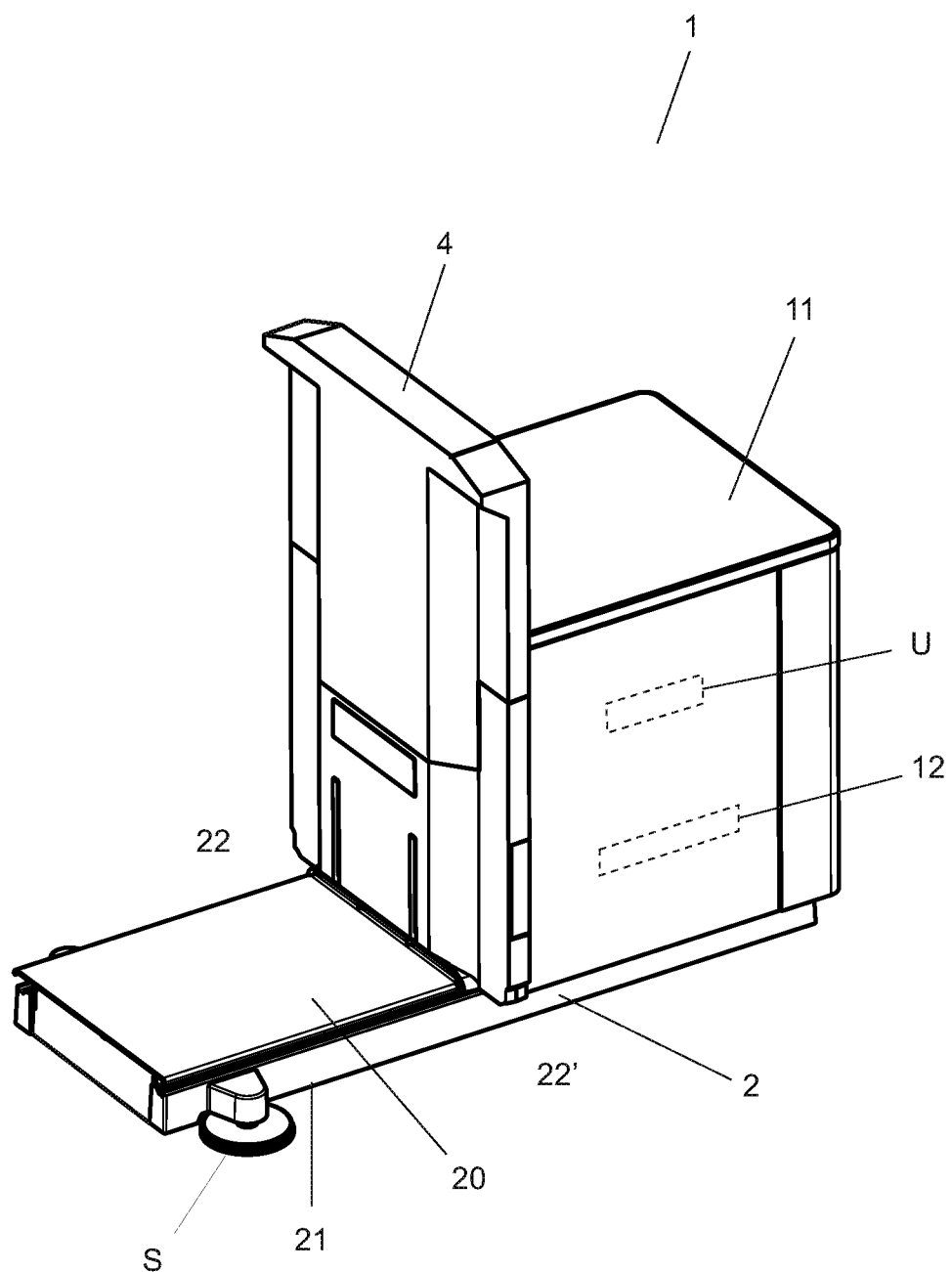
FIG. 3 represents the assembled base body, housing, and weighing chamber rear wall of the laboratory balance of FIG. 1, in a perspective view.

FIG. 3 shows the same laboratory balance 1 in a partially assembled state without draft shield 5 and weighing platform 14. Besides previously named elements, this drawing identifies the underside 21 of the base body 2 as well as a first side 22 and a second side 22', the latter two being, respectively, laterally to the left and right of the weighing chamber rear wall 4.

Figure 4:
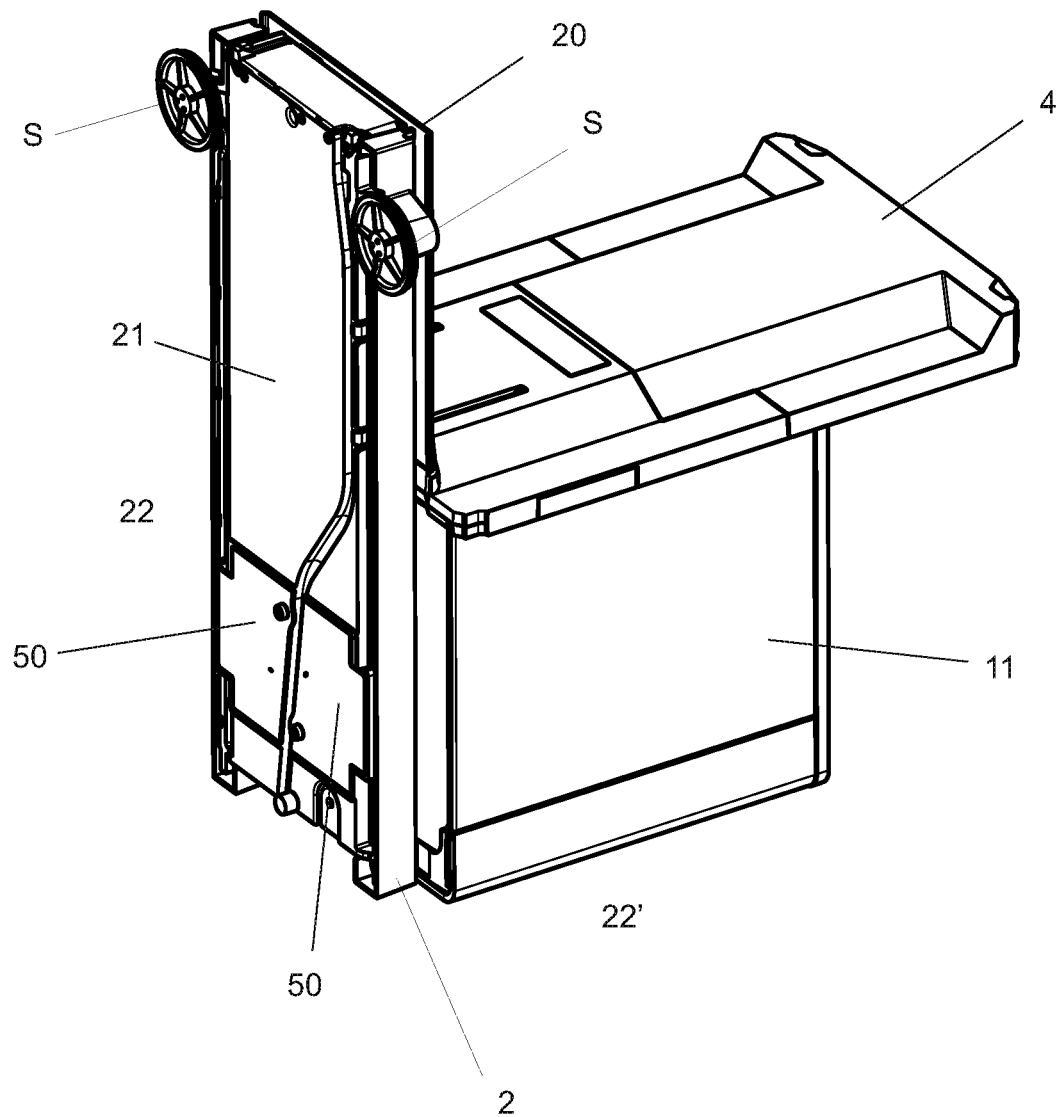
FIG. 4 shows the assembly of FIG. 3 tilted 90°, with the underside of the base body exposed.

In FIG. 4, the assembly of FIG. 3 is tilted 90°, with the rear wall of the housing 11 lying flat on a supporting surface, so that the underside 21 of the base body 2 is in a vertical position and exposed to view. In addition to previously named elements, this drawing shows the first and second sealing plates 50, which are covering cavities in the base body 2. The knurled thumbwheels of the adjustable support feet S at the front corners of the base body 2 can be clearly seen in this drawing.

Figure 5:
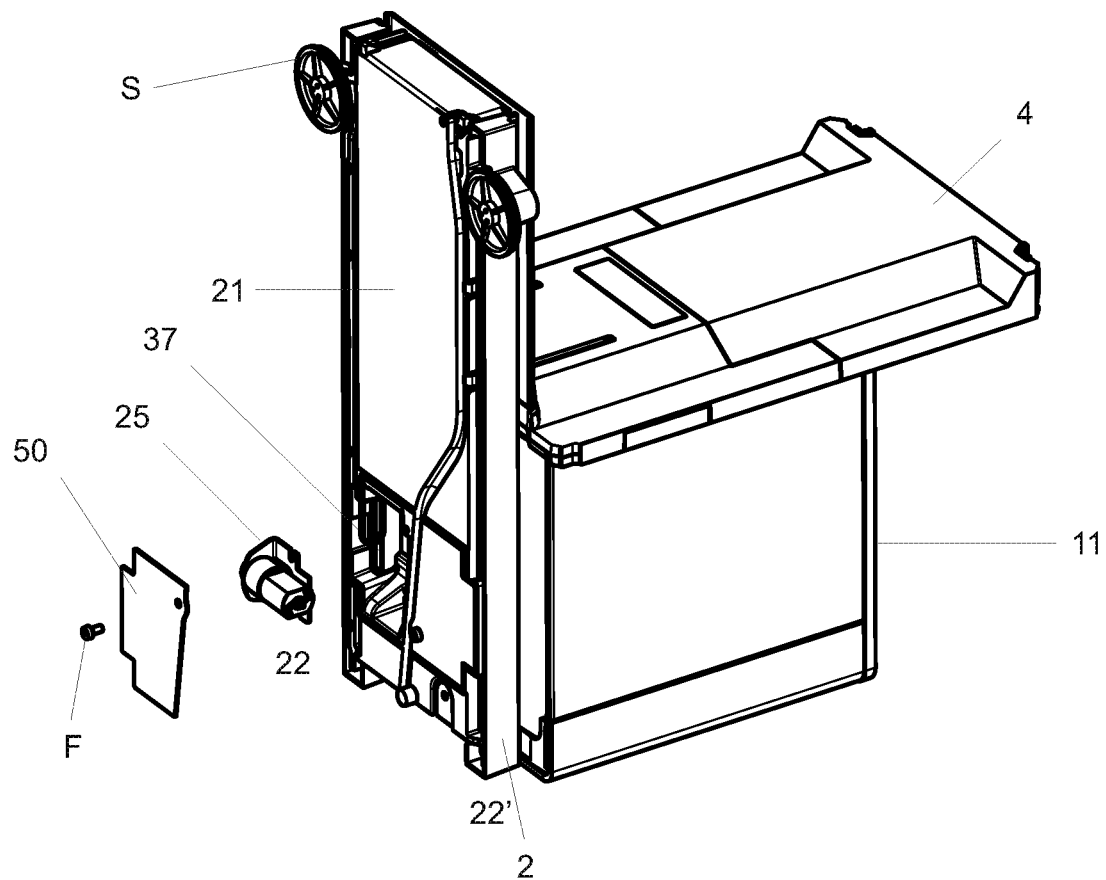
FIG. 5 is identical to FIG. 4, except that one motor unit is shown uninstalled.

In FIG. 5, the view of FIG. 4 is repeated, except that the first sealing plate 50 with the fastener F has been removed from the first opening 37 on the underside 21 of the base body 2, and the first motor unit 25 has been uninstalled and lifted out of the first opening 37.

Figure 6:
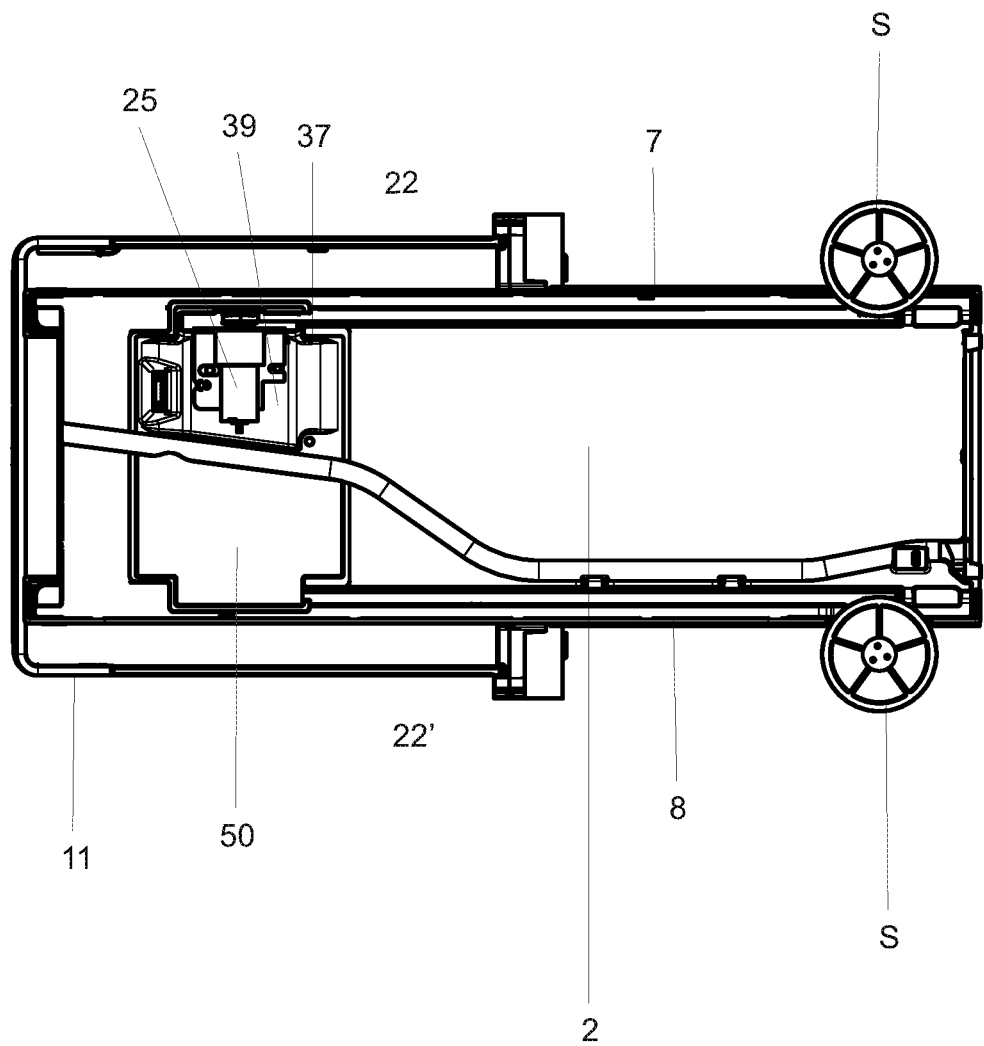
FIG. 6 shows a plan view of the underside of the base body with one motor unit uncovered and exposed to view.

FIG. 6 shows a plan view of the underside 21 of the base body 2, wherein the first sealing plate 50 is removed, so that the first motor unit 25 which is mounted in the first cavity 39 is uncovered and exposed to view through the first opening 37, while the second sealing plate 50 has been left in place.

Figure 7:
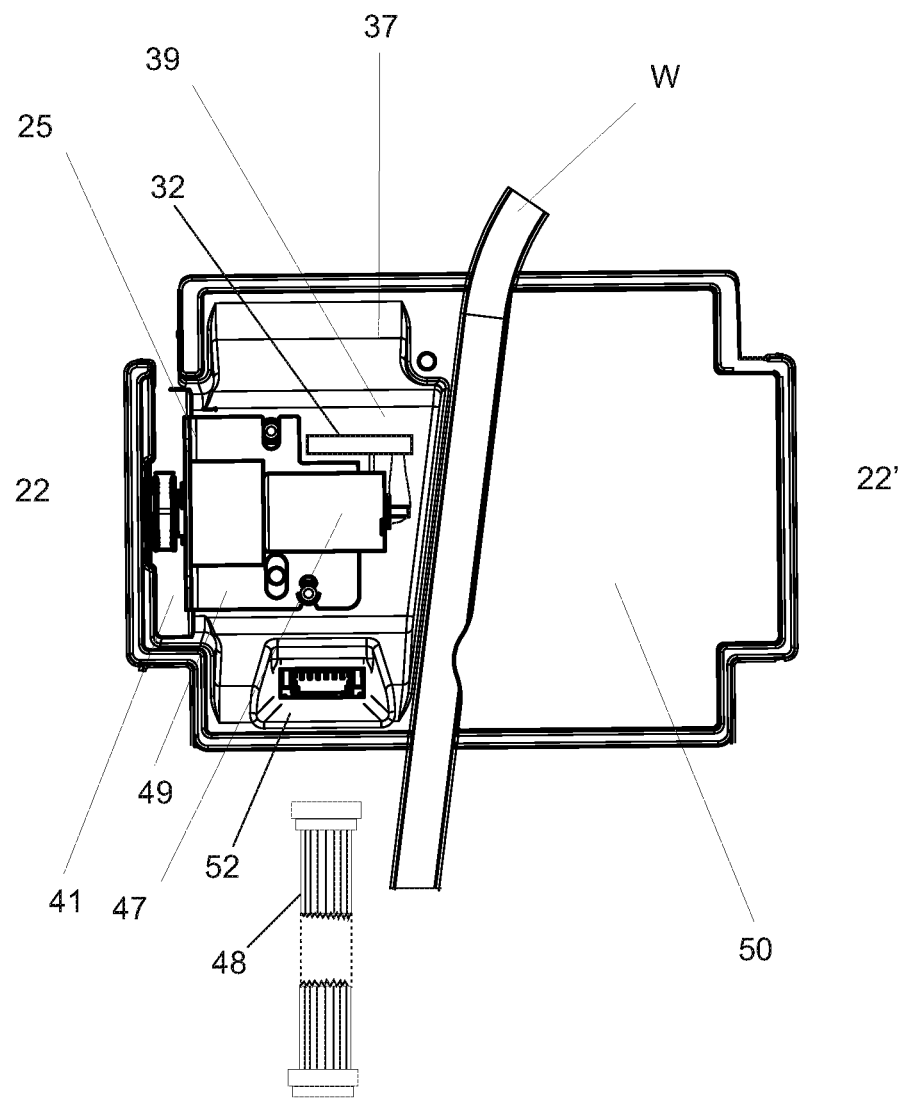
FIG. 7 represents an enlarged detail of FIG. 6.
Figure 8:
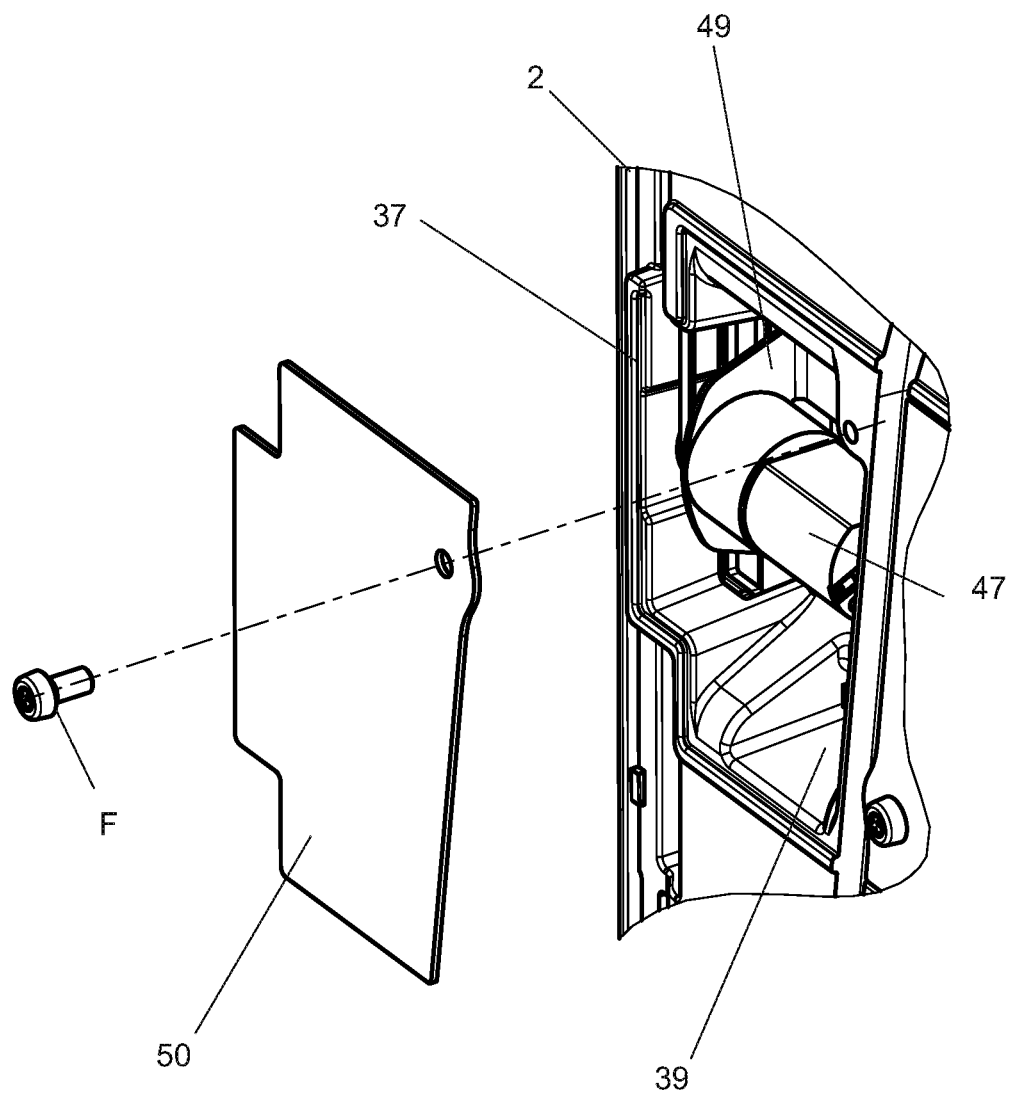
FIG. 8 shows the open first cavity with the first motor in a perspective view.
Figure 9:
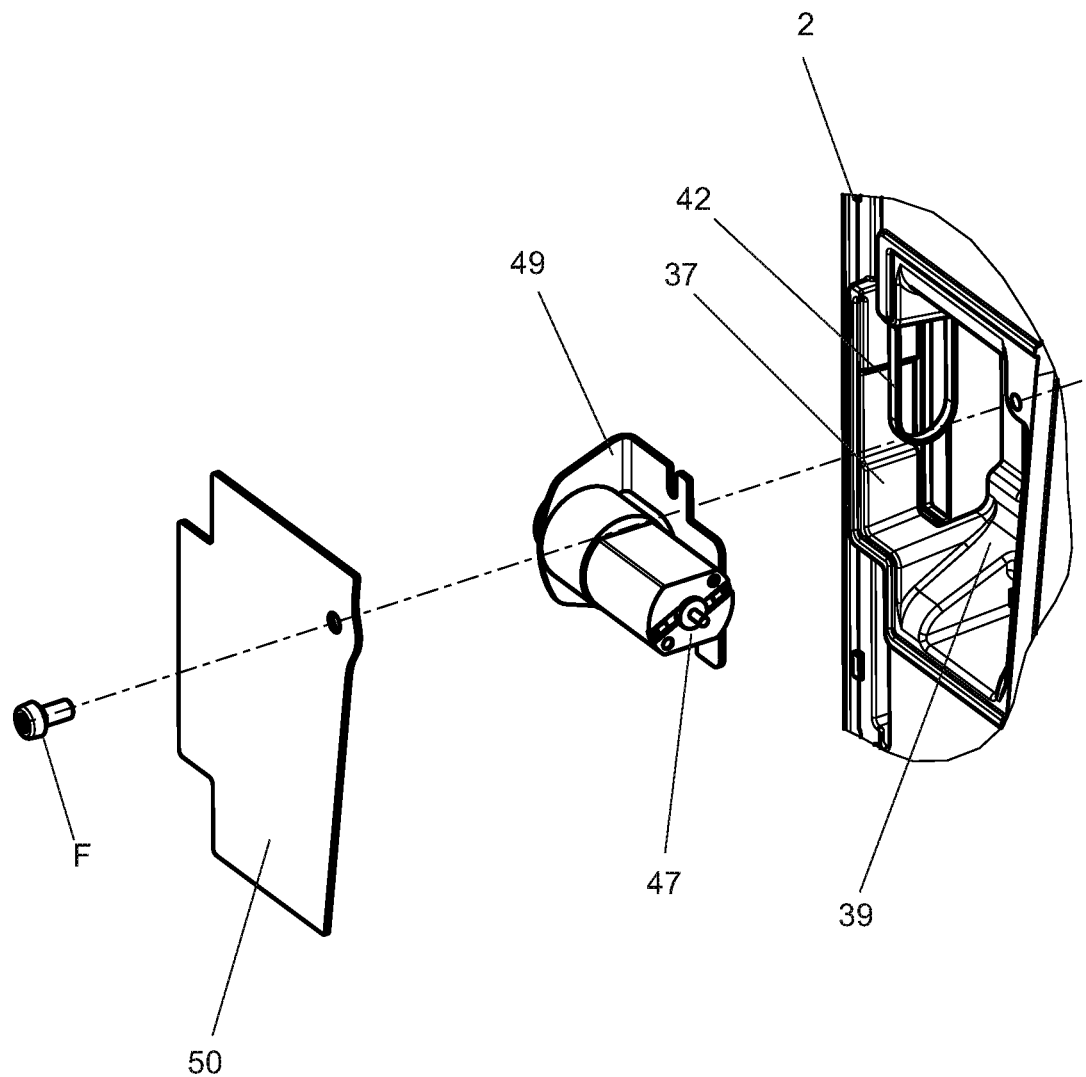
FIG. 9 shows the open first cavity, the uninstalled first motor and first sealing plate, in a perspective view.

FIG. 7 represents the first motor unit 25 of FIG. 6 and associated components in an enlarged detail view and rotated 90° counterclockwise from the position shown in FIG. 6. The first motor unit 25, which is mounted in the first cavity 39 and exposed to view through the first opening 37, includes the first mounting plate 49 on which the first motor 47 and the first electronic circuit 32 are mounted. The port 52 serves to connect the first motor unit 25 to the central control unit by way of the first wiring harness 48. The end of the first motor unit 25, which extends into the first slot 41, carries a drive pulley for a belt that connects to the first sidewall 7 of the draft shield 5. A power cable W, which can also be seen in FIGS. 4, 5 and 6, runs across the underside of the base body 2. FIG. 8 represents a perspective view of the same detail that is shown in the plan view of FIG. 7, and FIG. 9 repeats the view of FIG. 8, except that the first motor 47 has been uninstalled and lifted out of the first cavity 39, so that the first endless belt 42 which connects to the first sidewall 7 can be seen in this drawing.

Figure 10:
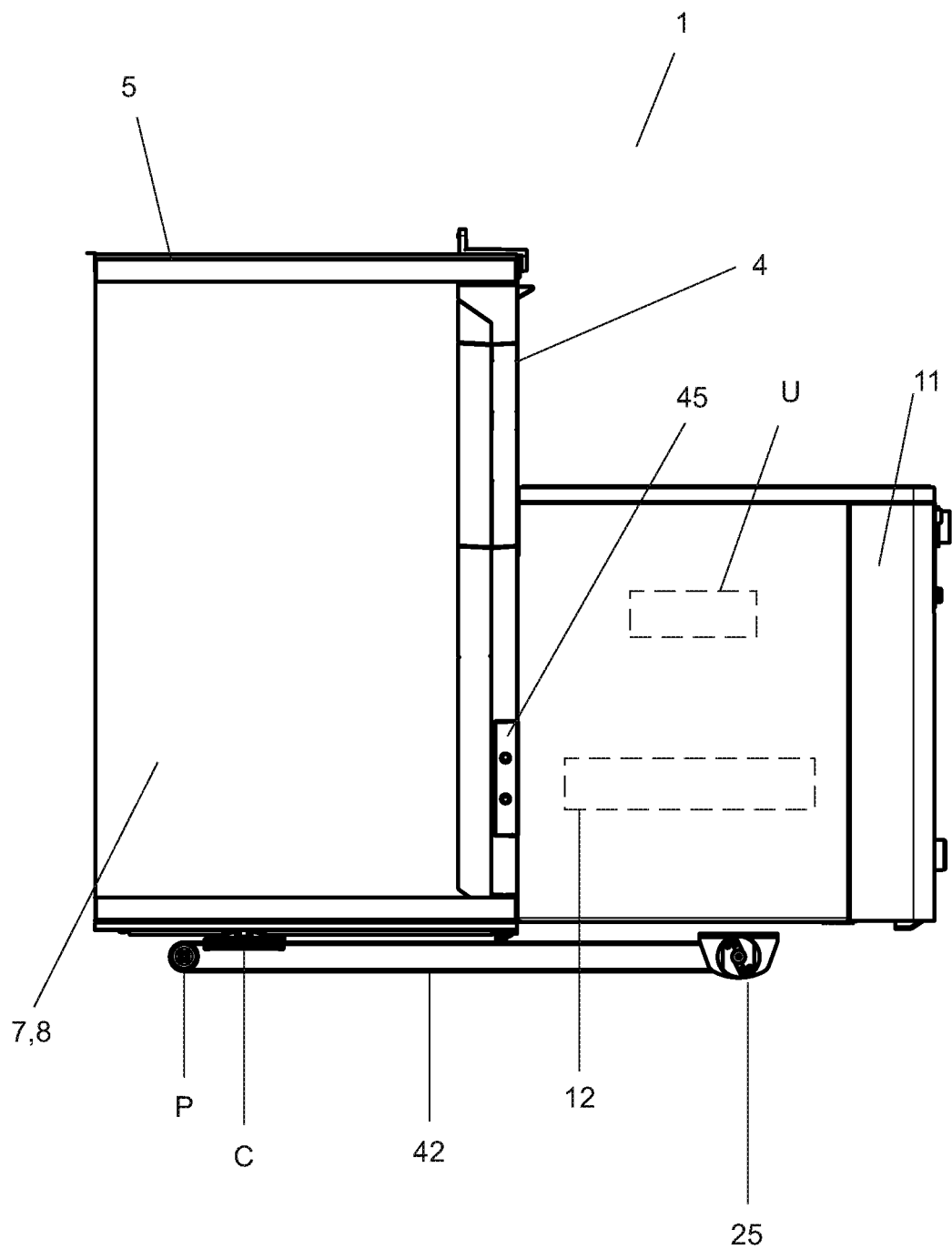
FIG. 10 represents a side elevation of the assembled draft shield and housing with the schematically indicated motor and belt drive of the sliding wall panel of the draft shield.

FIG. 10 illustrates the general principle and arrangement of the drive mechanism for the sliding sidewall panels 7, 8 of the draft shield 5. The motor units 25 are mounted in the base body 2 at a location vertically below the rear half of the housing 11. Endless belts 42 extend from drive pulleys of the motor units 25 to return pulleys P that are arranged vertically below a frontal area of the draft shield 5. The endless belt loops 42 include runner carriages C which engage, or are connected to, the sliding sidewall panels 7, 8. The latter connections are located in the front half of the bottom edge of the panels 7, 8. This arrangement of the endless belt loops 42 allow the sliding sidewall panels 7, 8 to travel between a fully closed position, where the front edges of the sliding sidewall panels meet the front wall 9, and a fully open position where the front edges of the sliding sidewall panels are retracted to the position of the weighing chamber rear wall 4. A first sensor 45 on the side of the first sliding sidewall panel 7 and a second sensor 45 on the side of the second sliding sidewall panel 8 serve to detect the positions of the side wall panels and send corresponding signals to the central control unit U which, in turn, controls the motor units 25.

Figure 11:
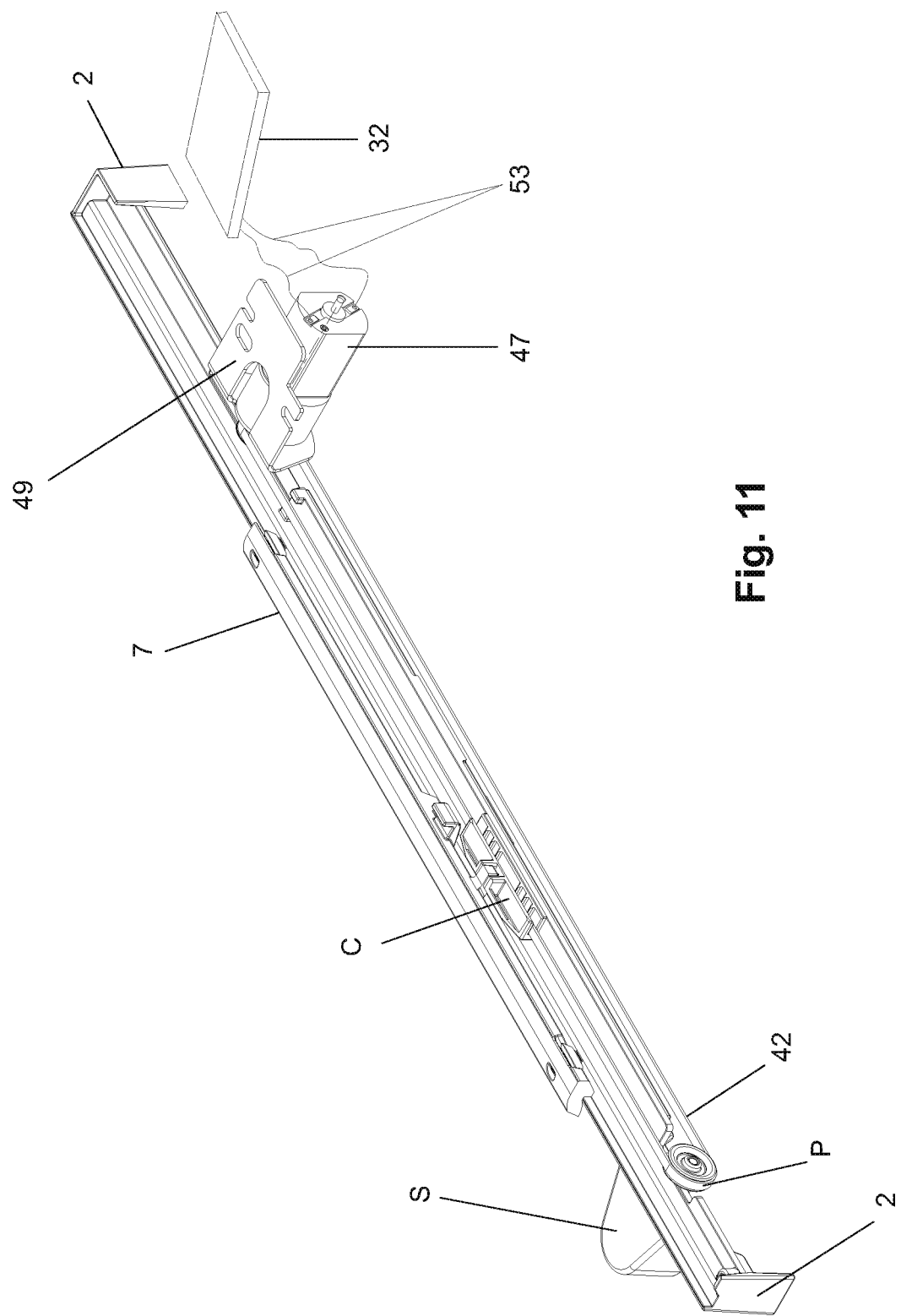
FIG. 11 shows a fragmentary perspective view of a part of the base body with installed motor and belt drive.
Figure 12:
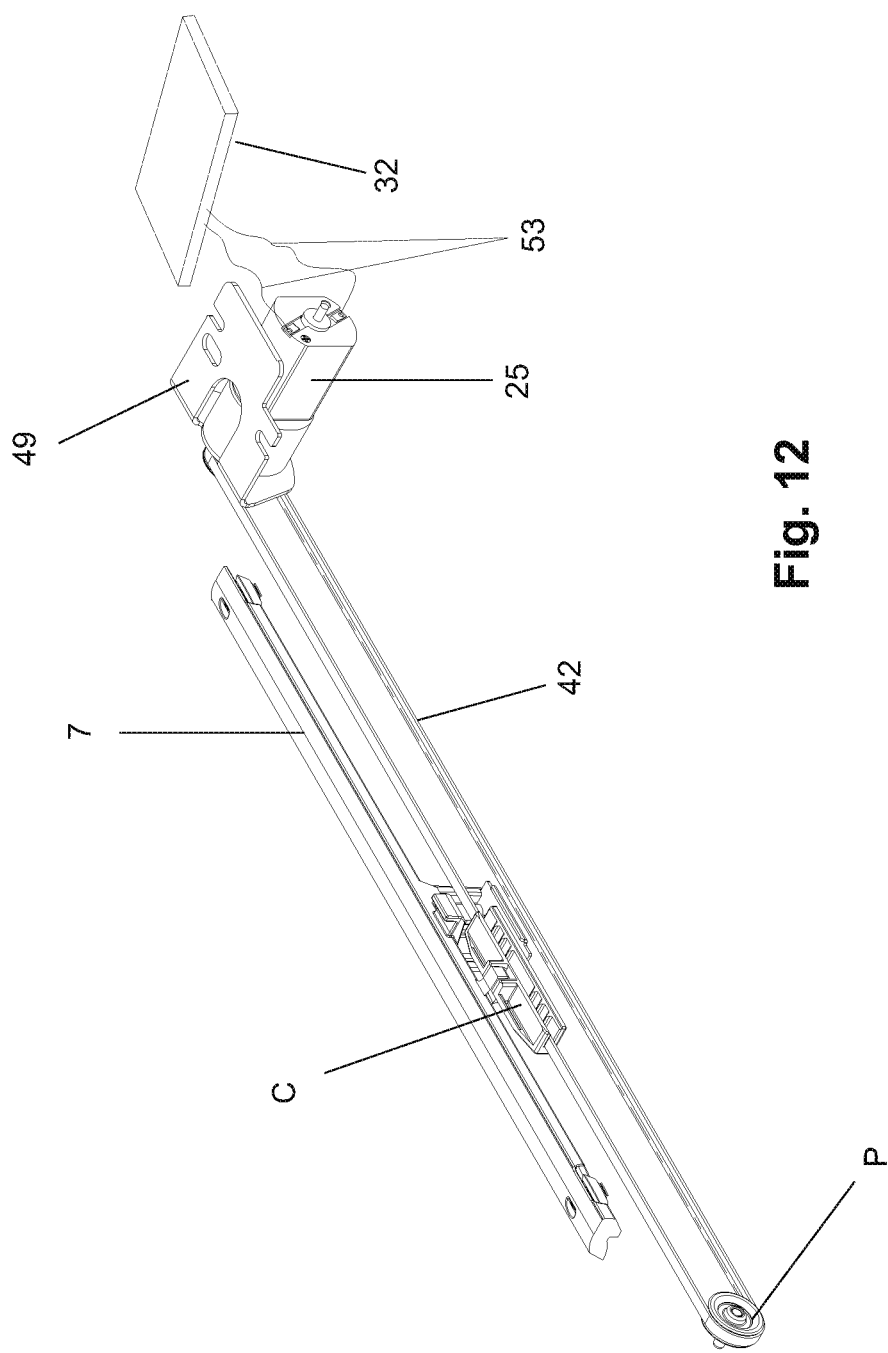
FIG. 12 shows the motor and belt drive in the same position as in FIG. 11, but without any part of the base body.

FIG. 11 shows a fragmentary detail view of the lateral border area on the left side of the base body 2 in which the first motor 47 and first endless belt 42 are installed. In addition to previously described elements, this drawing identifies wires 53 connecting the motor 47 to the electronic circuit 32. FIG. 12 shows the same detail as FIG. 11, with the fragmentary part of the base body 2 omitted for clarity.

The invention has been described through the presentation of one specific embodiment of the inventive concept of arranging the motor units 25 for the sliding sidewall panels 7, 8 in the base body 2 and providing openings on the underside 21 of the base body 2 through which the motor units 25 can be conveniently accessed. However, it is considered self-evident that numerous additional variants are encompassed by the teachings of the present invention, including for example rack-and-pinion drives, spindle drives, or friction wheel drives instead of the belt drives 42 for the kinematic connections between the motor units 25 and the corresponding sidewall panels 7, 8. Such combinations and variations of the inventive arrangement of the motor units for the sliding sidewall panels of the draft shield of the laboratory balance described and claimed herein are considered without exception to fall within the scope of protection that is hereby sought for the present invention.

What is claimed is:
1. A laboratory balance, comprising:
a housing;
a base body with an upper side that faces a weighing pan and an underside that faces oppositely to the upper side, the underside having a first opening;
a draft shield, mounted on the upper side of the base body, the draft shield having a top wall, a first sidewall, a second sidewall that is parallel to the first sidewall, and a front wall; and
a first motor unit for operating the first sidewall, the first motor unit being located in the base body, with the first opening in the underside providing access to the first motor unit, vertically below the housing.
2. The laboratory balance of claim 1, further comprising:
a second motor unit for operating the second sidewall, located in the base body.

3. The laboratory balance of claim 2, further comprising:
a second opening in the underside of the base body for providing access to the second motor unit.

4. The laboratory balance of claim 1, wherein the first motor unit also operates the second sidewall.

5. The laboratory balance of claim 3, wherein the respective first and second openings are located adjacent to one another.

6. The laboratory balance of claim 3, wherein the base body comprises a first cavity for receiving the first motor unit and a second cavity for receiving the second motor unit.

7. The laboratory balance of claim 3, further comprising:
a weighing cell; and
a central control unit, each of which is located within the housing; the housing being mounted on the upper side of the base body adjacent to the draft shield;
wherein the respective first and second openings are arranged at locations vertically below the housing.

8. The laboratory balance of claim 5, further comprising:
a first slot in the first cavity for a first endless belt that operatively connects the first motor unit to the first sidewall, and
a second slot in the second cavity for a second endless belt that operatively connects the second motor unit to the second sidewall.

9. The laboratory balance of claim 3, wherein each of the motor units comprises:
a motor;
a wiring harness;
a mounting plate for securing the motor inside the cavity associated therewith; and
an electronic circuit connected to the central control unit through the wiring harness.

10. The laboratory balance of claim 3, further comprising:
a first sealing plate that covers the first opening in the base body; and
a second sealing plate that covers the second opening.

11. The laboratory balance of claim 10, wherein:
each of the first and second sealing plates has a contour shape conforming to the respective first and second openings, with which each is associated.

12. The laboratory balance of claim 2, wherein the weighing cell, the first motor unit and the second motor unit, when present, are sealed from each other.

13. The laboratory balance of claim 2, wherein the first motor unit and the second motor unit, when present, are arranged beneath the weighing cell.

14. The laboratory balance of claim 2, further comprising:
a weighing chamber wall located on the upper side of the base body and positioned between the draft shield and the housing; the weighing chamber wall having a first side that corresponds to the first motor unit and a second side that corresponds to the second motor unit;
a first sensor device, located on the first side, which cooperates with the first motor unit to actuate the movements of the first sidewall; and
a second sensor device, located on the second side, which cooperates with the second motor unit to actuate the movements of the second sidewall.

* * * * *